Aug. 14, 1951    L. L. JASKEY    2,564,603
FISHING REEL
Filed Jan. 24, 1947    2 Sheets-Sheet 1
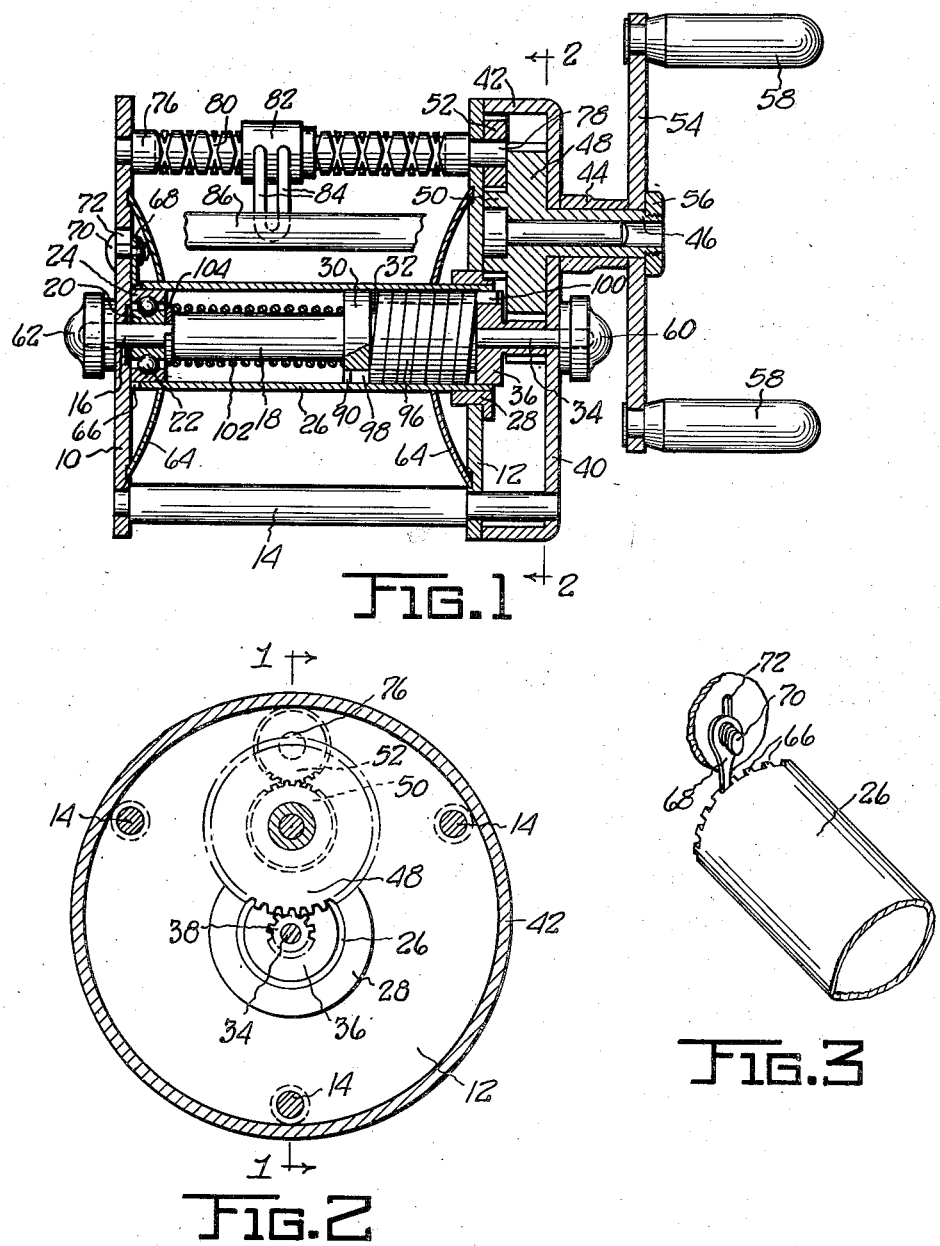
INVENTOR
LEO L. JASKEY.
BY
Oltsch & Knobloc
ATTORNEYS Aug. 14, 1951  L. L. JASKEY  2,564,603
FISHING REEL Filed Jan. 24, 1947  2 Sheets-Sheet 2

INVENTOR
LEO L. JASKEY.
BY
Oltsch + Knoblock
ATTORNEYS.

Patented Aug. 14, 1951

2,564,603

UNITED STATES PATENT OFFICE 2,564,603

FISHING REEL

Leo L. Jaskey, South Bend, Ind.

Application January 24, 1947, Serial No. 724,127

7 Claims. (Cl. 242—84.7)

This invention relates to improvements in fishing reels.

The primary object of the invention is to provide a simple, inexpensive and sturdy construction of reel which will permit control of the feeding of a line by "thumbing" the same.

A further object is to provide a fishing reel with a novel construction and arrangement of parts for the purpose of permitting rotation of the line spool in one direction independently of the crank mechanism of the reel which is utilized to rotate the spool of the reel to wind the line thereon.

A further object is to provide a fishing reel having a spool provided with a one-way clutch for connection with an operating crank handle and adapted to disengage the handle from the spool when the spool is rotated to play out the line, and provided further with a level wind mechanism which is operative at all times for the purpose of playing out the line uniformly and of guiding the line uniformly for level winding thereof upon the spool.

A further object is to provide a fishing reel having an arbor adapted to be driven by a crank operated mechanism and a spool having a hub encircling the arbor with an expansible clutch element associated with the arbor and normally clear of the spool so arranged that it is expanded into frictional driving engagement with the spool upon rotation of the driving means in one direction only.

Other objects will be apparent from the description and appended claims.

In the drawing:

Fig. 1 is a longitudinal sectional view of the device taken on line 1—1 of Fig. 2.

Fig. 2 is a transverse sectional view of the device taken on line 2—2 of Fig. 1;

Fig. 3 is a fragmentary detail perspective view of a sub-assembly of the device.

Figure 4:
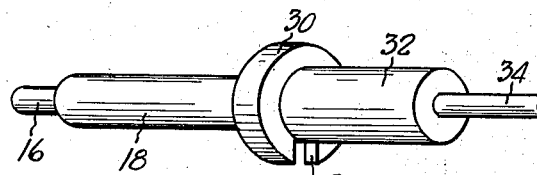
Fig. 4 is a perspective view of the arbor of the device.
Figure 5:
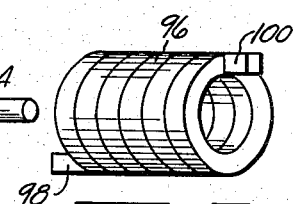
Fig. 5 is a perspective view of the expansible element of the clutch mechanism.

Referring to the drawings, and particularly to Figs. 1 to 6, which illustrate one embodiment of the invention the numeral 10 designates one end plate or disk of the reel, and the numeral 12 designates the opposite end plate or disk of the reel. These disks are connected together fixedly by a plurality of longitudinally extending rods 14 which cooperate with the plates 10 and 12 for the purpose of defining the frame of the reel. The end plate 10 has a central bore through which a reduced diameter end portion 16 of an arbor 18 extends. The arbor 18 is of the construction best illustrated in Fig. 4. A bearing having an inner race 20 fitting upon the arbor portion 16 mounts bearing elements 22 which are confined within an outer race 24. One end of a cylindrical member 26, which constitutes the hub of the spool of the reel, is carried by the outer race 24. The sleeve 26 is concentric with the arbor 18, and the opposite end of the sleeve 26 is journaled in a sleeve bearing 28 which is supported in a large opening in the plate 12. The arbor 18 is held in concentric relation in the sleeve 26 by an enlarged cylindrical portion 30 which fits snugly but rotatably within the sleeve 26 and which is formed on the arbor in spaced relation to the reduced diameter end portion 16 of the arbor. The arbor 18 includes a drum portion 32 of smaller diameter than the inner diameter of the sleeve 26 which terminates in inwardly spaced relation to the right-hand end of the sleeve 26 as viewed in Fig. 1. A reduced dimension terminal portion 34 projects from the drum portion 32 of the arbor and projects in spaced relation beyond the disk 12.

Figure 6:
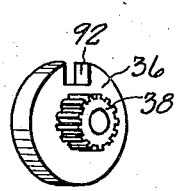
Fig. 6 is a perspective view of another element of the clutch mechanism.

A sleeve of the character best illustrated in Fig. 6 fits upon the reduced portion 34 of the arbor. This sleeve constitutes a disklike end part 36 of a diameter to fit snugly but rotatably within the righthand end of the sleeve 26, as viewed in Fig. 1, and a reduced diameter portion forming a pinion 38. The pinion 38 is retained in place by an end cap having a circular wall 40 and a cylindrical wall 42, the edge of which bears against the marginal portion of the plate 12. The cap 40, 42 is held in place by the posts or rods 14 which extend therethrough. A collar 44 projects from the end wall 40 of the cap eccentrically thereof and serves to journal a tubular extension 46 projecting axially from a gear 48 which meshes with the pinion 38. The gear 48 has a pinion 50 projecting axially therefrom at its inner end which meshes with a pinion 52. A crank arm 54 is secured upon the tubular member 46 as by the nut 56. The opposite ends of the crank arm 54 mount handle elements 58 which are free to rotate on the crank arm 54 in a manner well understood in the art. It will be observed that the cap 40, 42 cooperates with the plate 12 to define a chamber within which are confined the elements constituting the gear train effecting driving connection between the crank 54, 58 and the arbor 18. The reduced end 34 of the arbor 18 projects beyond the end wall 40 of the cap and is journaled in a bearing member 60 secured to wall 40. A similar bearing 62 is mounted upon the plate 10 and journals the opposite end portion 16 of the arbor 18. The two bearings 60 and 62 serve to prevent end play of the arbor.

The spool of the reel is formed by the hub 26 and by concavo-convex end plates 64 which are fixedly secured to the sleeve 26 adjacent the opposite ends thereof. The end plates 64 flare radially outwardly and preferably fit within circular recesses formed in the inner faces of the end plates 10 and 12 with clearance permitting free rotation thereof relative to said end plates in a manner well understood in the art. A clicking or retarding arrangement may be provided in the reel if desired, and one form thereof is illustrated in Fig. 3. In this form the lefthand end of the sleeve 26, as viewed in Fig. 1, is provided with a plurality of teeth or notches 66 positioned outwardly relative to the adjacent end plate 64 and engageable by a spring pressed detent 68 carried by a pin 70 slidable in an elongated slot 72 formed in the end plate 10.

The level wind mechanism of the reel constitutes the shaft 76 which is journaled in aligned openings formed in the plates 10 and 12 with its reduced end portion 78 projecting into the cap 40, 42 to form the hub of the pinion 52 which is fixedly secured thereon. The shaft 76 is provided with a double or reverse helical lead groove 80. A cylindrical member 82 encircles the shaft 76 and is freely slidable thereon, said sleeve 82 preferably being provided with a pin or other projection in its inner surface engageable with the groove 80 for the purpose of translating rotation of the shaft 76 into movement of the member 82 longitudinally of the shaft. A line guide is carried by the member 82 and as here illustrated comprises a U-shaped member 84 projecting from the member 82. The assembly 82, 84 is preferably spring pressed to desired position by spring means (not shown) which urge the member 84 into engagement with a bar 86 extending longitudinally of the reel.

The enlarged central portion 30 of the arbor 18 is provided with a radial notch 90 preferably of a depth corresponding to the difference in the diameters of portions 30 and 32 of the arbor 18. The disk 36 is provided with a similar notch 92. A tight wound coil spring 96 encircles the drum portion 32 of the arbor and is preferably formed of spring wire of rectangular cross-section with its adjacent convolutions in engagement with each other. In the normal relation of this spring it fits upon the drum 32 in such a manner that its outer periphery has clearance with the inner surface of the sleeve 26. A projection 98 is formed at one end of the spring 96 and extends longitudinally therefrom and within the notch 90 of the member 30. A similar longitudinal projection 100 extends from the opposite end of the spring 96 and fits within the notch 92 of the disk 36. It will be apparent that the spring 96 serves to form a driving connection between the arbor 18 and the pinion 38 formed integrally with the member 36, and this connection is effective to transmit driving rotation of the parts in either direction of rotation. However, inasmuch as the normal outer diameter of the spring 96 is such as to provide a clearance between the same and the sleeve 26, there is no driving connection effected normally between the arbor 18 and the spool hub 26. However, when the crank 54 is rotated in such a direction as to tend to expand the spring 96 incident to transmission of rotation from the pinion member 36, 38 to the arbor 18, that expansion will cause the spring 96 to frictionally engage the interior of the spool hub 26 and thereby effect a driving connection between the arbor 18 and the spool hub 26. The parts are so arranged that this expansion of the spring occurs when the crank 54 is rotated in a direction to wind the line upon the spool of the reel. Consequently, any line retrieving operation of the crank 54 will drive the spool. The normal clearance between the spring 96, when contracted, and the spool hub 26 will permit reverse rotation of the spool and playing out of the line without rotating the spring 96 on the associated parts of the gear train and crank 54.

It will be apparent from the foregoing that when the reel is used for casting purposes entailing playing out or unwinding of the line from the reel, there will be no transmission of the rotation of the spool hub 26 to the arbor 18 and the mechanism associated therewith. In other words, the spool is free to spin or rotate in unwinding direction without the drag or retarding action of the gear train. Also, the crank arm 56 is disengaged from the reel spool and there is no tendency of the same to rotate. Consequently, the angler is permitted to entirely regulate the play of the line by the pressure of the thumb applied to the line carrying spool in the manner well understood in the art. The construction serves therefore to permit the achieving of longer casts of the fishing lure attached to the end of the line while avoiding the objection of the free spinning crank which is characteristic of reels wherein the driving connection between the spool and the crank is maintained in the casting operation as well as in the retrieving operation. At the same time the device is responsive to and effectively transmits, without appreciable play, any line retrieving operation of the crank.

The operation of the device may be somewhat improved by interposing a coil spring 103 encircling the arbor 18 between the member 30 and a ring or friction disc 104 which is pressed by the opposite end of the spring 102 against the bearing 20, 24. The resulting end thrust of the bearing against the end plate 10 provides a friction drag transmitted through washer 104 and spring 102 to the shaft 18 at flange 30. Specifically, end thrust by spring 102 is transmitted by friction disc 104 and inner bearing race members 20 against the bearing elements 22, and in turn by said bearing elements 22 to the outer bearing race member 24 which is pressed against end plate 10. The friction drag on arbor 18 is sufficient to insure the expansion of the spring 96 when the crank 54, 58 is rotated in line-retrieving direction to frictionally engage the interior of the hub 26.

Figure 7:
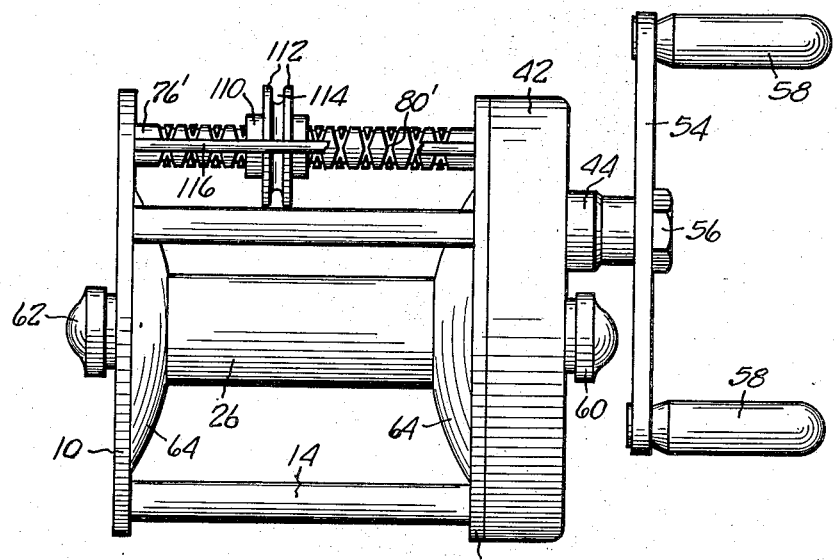
Fig. 7 is a view in elevation of a modified embodiment of the invention.
Figure 8:
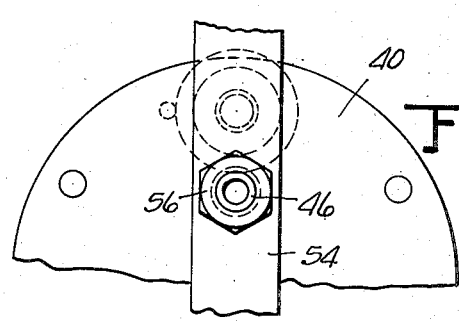
Fig. 8 is a fragmentary end view of the device shown in Fig. 7 viewed from the right in Fig. 7.

The embodiment illustrated in Figs. 7 and 8 is the same as that illustrated in Figs. 1 to 6 insofar as the provision of the clutch spring 96 interposed between the crank arm 54 and the spool hub 26 is concerned. In this construction, however, the shaft 76' is fixedly secured between the plates 10 and 12, and the pinion 52 of the construction previously described is omitted. A rotatable member 110 encircles the shaft 76' and has an internal projection which rides in the reverse helical groove 80' of the shaft 76'. The member 110 preferably includes a large diameter spool portion defined by a pair of spaced flanges 112 which have a deep line receiving narrow groove 114 therebetween. A line guide rod 116 is fixedly secured to the end plates 10 and 12 in such a position with relation to the spool hub 26 and the shaft 76' that a line when passed therearound between the line groove 114 of the member 110 and the spool hub 26, is tensioned. In this construction it will be apparent that the line guide is operative both in the operation of the reel to cast or play out the line and in the reverse operation to retrieve the line. This insures proper guiding of the line at all times, both for level winding purposes when retrieving and for the purpose of preventing fouling of the line in casting. The Figs. 7 and 8 construction thus provides all of the advantages which have been mentioned above with reference to the Fig. 1 construction, and additionally provides greater control of the line than is possible with the Fig. 1 construction.

I claim:

1. A fishing reel comprising a frame, an arbor rotatable therein, a gear train carried by said frame and including an element axially aligned with and rotatable relative to said arbor, an operator for said gear train positioned exteriorly of said frame, a yielding coiled expansible member concentric with and connecting said aligned element and arbor, and a spool journaled in said frame and having a tubular hub encircling said arbor and expansible member, said expansible member being actuated from a normal position free of said hub to an expanded hub-driving position upon rotation thereof by said gear train and operator in one direction.

2. A fishing reel comprising a frame, an arbor rotatable therein, a gear train carried by said frame and including an element axially aligned with and rotatable relative to said arbor, an operator for said gear train positioned exteriorly of said frame, a yielding coiled expansible member concentric with and connecting said aligned element and arbor, and a spool journaled in said frame and having a tubular hub encircling said arbor and expansible member, said expansible member being actuated from a normal position free of said hub to an expanded hub-driving position upon rotation thereof by said gear train and operator in one direction, and friction means exerting a slight rotation retarding force on said arbor.

3. A fishing reel comprising a frame, an arbor rotatable therein, drive means carried by said frame and including an operator and a gear train including an element coaxial with said arbor, a coil spring encircling said arbor and anchored at its opposite ends to said arbor and to said coaxial element, and a line spool journaled in said frame and having a tubular hub concentric with and encircling said arbor and spring and of an inner diameter slightly greater than the normal outer diameter of said spring, said spring being expanded radially into frictional driving engagement with said hub by rotation of said drive means in one direction.

4. A fishing reel comprising a frame, an arbor rotatable therein, drive means carried by said frame and including an operator and a gear train including an element coaxial with said arbor, a coil spring encircling said arbor and anchored at its opposite ends to said arbor and to said coaxial element, and a line spool journaled in said frame and having a tubular hub concentric with and encircling said arbor and spring and of an inner diameter slightly greater than the normal outer diameter of said spring, said spring being expanded radially into frictional drive engagement with said hub by rotation of said drive means in one direction, and yielding means retarding rotation of said arbor.

5. A fishing reel comprising a frame, an arbor rotatable therein, drive means carried by said frame and including an operator and a gear train including an element coaxial with said arbor, a coil spring encircling said arbor and anchored at its opposite ends to said arbor and to said coaxial element, and a line spool journaled in said frame and having a tubular hub concentric with and encircling said arbor and spring and of an inner diameter slightly greater than the normal outer diameter of said spring, said spring being expanded radially into frictional driving engagement with said hub by rotation of said drive means in one direction, a second coil spring spaced from said first spring and encircling said arbor, said arbor having an abutment engaged by one end of said second spring, and a friction disc engaged by the other end of said second spring, said second spring being held under compression between said abutment and said disc.

6. A fishing reel comprising a frame, an arbor rotatable therein and having a notched concentric enlargement intermediate its ends, drive means carried by said frame and including a notched element in axial alignment with said arbor, yielding means for exerting a slight rotation-restraining action on said arbor, a coil spring encircling one end portion of said arbor and having longitudinal projections at its ends seating in said notches, and a spool journaled in said frame and having a hub encircling said spring and arbor and of an interior diameter normally having a slight clearance with said spring.

7. A fishing reel comprising a frame, an arbor rotatable therein and having a notched concentric enlargement intermediate its ends, drive means carried by said frame and including a notched element in axial alignment with said arbor, yielding means for exerting a slight rotation-restraining action on said arbor, a coil spring encircling one end portion of said arbor and having longitudinal projections at its ends seating in said notches, and a spool journaled in said frame and having a hub encircling said spring and arbor and of an interior diameter normally having a slight clearance with said spring, said coil spring being tight wound with its convolutions substantially in engagement and being formed of wire of rectangular cross-section presenting a substantially continuous smooth outer periphery for substantially its full length.

LEO L. JASKEY.

REFERENCES CITED

The following references are of record in the file of this patent:

UNITED STATES PATENTS

| Number | Name | Date |
|---|---|---|
| 325,813 | Briggs | Sept. 8, 1885 |
| 929,867 | Meisselbach et al. | Aug. 3, 1909 |
| 1,145,038 | Schramm | July 6, 1915 |
| 1,575,619 | Catucci | Mar. 9, 1926 |
| 1,948,886 | Russell | Feb. 27, 1934 |
| 2,176,247 | Coxe | Oct. 17, 1939 |
| 2,257,023 | Ray | Sept. 23, 1941 |
| 2,364,047 | Bardon | Dec. 5, 1944 |

FOREIGN PATENTS

| Number | Country | Date |
|---|---|---|
| 197,178 | Great Britain | May 10, 1923 |
| 659,255 | Germany | Apr. 29, 1938 |